United States Patent
Hall et al.

(10) Patent No.: US 7,142,129 B2
(45) Date of Patent: Nov. 28, 2006

(54) METHOD AND SYSTEM FOR DOWNHOLE CLOCK SYNCHRONIZATION

(75) Inventors: David R. Hall, Provo, UT (US); David B. Bartholomew, Springville, UT (US); Monte Johnson, Orem, UT (US); Justin Moon, Bountiful, UT (US); Roger O. Koehler, Provo, UT (US)

(73) Assignee: IntelliServ, Inc., Provo, UT (US)

( * ) Notice: Subject to any disclaimer, the term of this patent is extended or adjusted under 35 U.S.C. 154(b) by 318 days.

(21) Appl. No.: 10/710,875

(22) Filed: Aug. 10, 2004

(65) Prior Publication Data

US 2005/0035875 A1 Feb. 17, 2005

Related U.S. Application Data

(63) Continuation-in-part of application No. 10/710,790, filed on Aug. 3, 2004.

(60) Provisional application No. 60/481,225, filed on Aug. 13, 2003.

(51) Int. Cl.
*G01V 3/00* (2006.01)

(52) U.S. Cl. ............ 340/853.3; 367/82; 375/354; 709/248; 713/400

(58) Field of Classification Search ............ 340/853.1, 340/853.3; 367/82; 175/48; 370/516; 375/354; 709/248; 713/400
See application file for complete search history.

(56) References Cited

U.S. PATENT DOCUMENTS

| | | | |
|---|---|---|---|
| 4,872,765 A | 10/1989 | Schodowski | |
| 6,370,161 B1 * | 4/2002 | Ehrlich et al. | 370/516 |
| 6,400,646 B1 | 6/2002 | Shah et al. | |
| 6,424,595 B1 | 7/2002 | Chenin | |
| 6,439,046 B1 | 8/2002 | Kruspe et al. | |
| 6,614,718 B1 | 9/2003 | Ceconi et al. | |
| 6,618,674 B1 * | 9/2003 | Ireland et al. | 702/6 |
| 6,641,434 B1 | 11/2003 | Boyle et al. | |
| 6,670,880 B1 | 12/2003 | Hall et al. | |
| 6,688,395 B1 | 2/2004 | Floerke et al. | |
| 6,826,123 B1 * | 11/2004 | Herring | 368/46 |
| 6,912,465 B1 * | 6/2005 | Collins et al. | 702/6 |
| 6,949,955 B1 * | 9/2005 | Glasser | 326/93 |
| 6,990,045 B1 * | 1/2006 | Jackson | 367/81 |

OTHER PUBLICATIONS

Galison, Peter, "Einstein's Clocks, Poincare's Maps : Empires of Time" W.W. Norton & Company, 2003, p. 14-23.*

* cited by examiner

*Primary Examiner*—Albert K. Wong
(74) *Attorney, Agent, or Firm*—Jeffrey E. Daly; Tyson J. Wilde

(57) ABSTRACT

A method and system for use in synchronizing at least two clocks in a downhole network are disclosed. The method comprises determining a total signal latency between a controlling processing element and at least one downhole processing element in a downhole network and sending a synchronizing time over the downhole network to the at least one downhole processing element adjusted for the signal latency. Electronic time stamps may be used to measure latency between processing elements. A system for electrically synchronizing at least two clocks connected to a downhole network comprises a controlling processing element connected to a synchronizing clock in communication over a downhole network with at least one downhole processing element comprising at least one downhole clock. Preferably, the downhole network is integrated into a downhole tool string.

21 Claims, 6 Drawing Sheets

METHOD AND SYSTEM FOR DOWNHOLE CLOCK SYNCHRONIZATION

CROSS REFERENCE TO RELATED APPLICATIONS

The present application is a continuation-in-part of co-pending U.S. patent application Ser. No. 10/710,790 filed on Aug. 3, 2004, which is herein incorporated by reference. Said application, Ser. No. 10/710790 claims priority of co-pending U.S. Provisional Patent Application Ser. No. 60/481,225 filed Aug. 13, 2003, which is herein incorporated by reference.

FEDERAL RESEARCH STATEMENT

This invention was made with government support under Contract No. DE-FC26-01NT41229 awarded by the U.S. Department of Energy. The government has certain rights in the invention.

BACKGROUND OF INVENTION

The present invention pertains to drilling operations and, more particularly, to the synchronization of clocks over a downhole network. In modern drilling, much importance is placed on the gathering of accurate, concise, and detailed information about the drilling environment. This information may prove itself to be invaluable upon making decisions relating to drilling operations and strategy. For example, detailed information regarding the shape and content of a natural formation can be a valuable resource for electing a point of entry into the formation.

Such information is often collected using seismic measurements, a practice well known in the art. Typically, a seismic source is used to send acoustic waves through an earth formation. The waves disperse through the formation, bouncing off of various features of the formation and causing reflection waves which are detected by sensors situated at different locations relative to the formation. The data from the reflection waves is analyzed to determine physical characteristics of the formation.

Such measurements are most advantageous when they are compared with other measurements from different locations during the same time interval. In order for seismic and other measurements to provide an accurate depiction of the object of interest, precise time-specific data are ideal. Often this involves the use of synchronized clocks in which the data taken from several locations is overlaid for a given time interval. However, some of the most useful seismic measurements in a drilling environment are recorded downhole. A typical drill string can be as long as 10,000 to 20,000 feet. Due to extremes in temperature, pressure, vibration, jolts, and other factors, a downhole clock can very easily develop a drift from a clock located on the surface or at another location on the drill string. Various methods of establishing and maintaining a system of two or more synchronized clocks in a drilling environment are recognized in the art.

U.S. Pat. No. 6,614,718 to Cecconi et al. discloses a device and method allowing seismic measurements to be performed in a well during drilling, comprising, above ground, a seismic source and a recorder connected to one or several seismic reference sensors and, downhole, a seismic sensor mounted in a drill string, wherein the seismic sensors and recorders comprise a low drift synchronized clock system, characterized in that the clock comprising the underground seismic sensor is a dual mode type clock.

U.S. Pat. No. 6,400,646 to Shah et al. discloses an acoustic system for synchronizing a clock in a well containing a drill string with a clock located near the surface of the well. The system includes devices for transmitting and receiving a pair of acoustic signals between locations comprising each clock and processing those signals.

U.S. Pat. No. 6,424,595 to Chenin discloses a method for downhole clock synchronization without the use of an electrical connection. The clocks are synchronized using acoustic and mud pulse communication methods.

U.S. Pat. No. 6,439,046 to Kruspe, et al. discloses an apparatus and method for synchronized formation measurement wherein a sensor is mounted on a drill string for sensing a parameter of interest. Two clocked controllers are synchronized such that the surface controller is performing certain tasks in timed sequence with the sensor even though the surface controller is not connected to the sensor.

Further, several types of systems for taking downhole measurements currently exists. Often logging instruments are lowered into a well bore during a pause in drilling. Another system is described in U.S. Pat. No. 6,670,880 to Hall, et al., which discloses a downhole data transmission system in which data can be transmitted through a string of downhole components. In one embodiment of the "880 patent, a tool string comprises a plurality of downhole components, each with a first transmission element in one end and a second transmission element in another end. Each transmission element comprises a magnetically conductive, electrically insulating trough that houses an electrically conductive coil. The coils in each end of the component are connected by an electrical conductor. When the components are connected in a drill string, data transmission is enabled through the drill string. When measurements are made downhole, they may be conveyed to the surface by means of the system incorporated into the tool string.

SUMMARY OF INVENTION

The present invention relates to a method and a system for synchronizing two or more clocks in a downhole network. The method comprises determining total signal latency between a controlling processing element comprising a synchronizing clock and at least one downhole processing element comprising at least one downhole clock. Both processing elements are connected to a downhole network. The method further comprises the controlling processing element sending a synchronizing time adjusted for total signal latency over the downhole network to the downhole tool processor.

It should be noted that, as used herein, the term "downhole" is intended to have a relatively broad meaning, including such environments as drilling in oil and gas; gas and geothermal exploration; and the systems of casings and other equipment used in oil, gas, and geothermal production.

It should also be noted that the term "latency" is intended to have a relatively broad meaning. "Computational latency" refers to the amount of time it takes for an instruction to be received and processed in a device (i.e. the time elapsed between receiving a request for information and transmitting said information). "Transmission latency" refers to the amount of time it takes for an electrical pulse to travel from one device to another over a downhole network integrated into a downhole tool string. "Total signal latency" refers to a combination of computational latency and transmission latency.

The downhole network comprises a downhole data transmission system comprising a plurality of downhole components; each with a communication element proximate one end connected to a communication element proximate another end by an electric conductor. In some embodiments, the downhole network is governed by a server processor. In other embodiments, the downhole network is a peer-to-peer network. The downhole network provides a fast means of communication between a plurality of devices connected to it. In one embodiment, the communication elements in the downhole components comprise inductive coils encapsulated in circular magnetically conductive, electrically insulating troughs. Data transmission rates in such a system may reach in excess of 1,000,000 bits/second.

In accordance with one embodiment of the invention, electronic time stamps are used to measure transmission latency between the processing elements by logical computations. The controlling processing element may be a computer processor located at the surface of a drilling operation. Preferably, the controlling processing element is connected to a time source such as a Global Positioning System (GPS) receiver. In other embodiments, the time source may be in communication with the controlling processing element over a local area network (LAN). The at least one downhole processing element may be a downhole tool processor, and is in electronic communication with a clock. Both processing elements are also in communication with the downhole network through a plurality of transmission elements, such as may be found in sections of drill pipe in a downhole drill string. The method further comprises the controlling processing element determining a synchronization time adjusted for total signal latency, and sending an instruction to the downhole processing element to set the downhole clock to the synchronization time. Further the downhole clocks may be distributed along the downhole tool string. The clocks may also be associated with tools selected from the group consisting of mud motors, turbines, jars, repeaters, amplifiers, nodes, mud hammers, shock absorbers, reamers, under-reamers, fishing tools, steering elements, MWD tools, LWD tools, seismic sources, seismic receivers, sensors, modems, swivels, pumps, perforators, other tools with an explosive charge, mud-pulse sirens, well casing, blow-out preventors, bottom hole assemblies, switches, routers, multiplexers, piezoelectric devices, optical transmitter, optical regenerators, optical receivers, and wireless transceivers. The clock may be in a node which communicates with a tool, or the clock may be incorporated in the tool. In one aspect of the invention all of the nodes have clocks, in other embodiments only some of the nodes have clocks. Further all of the tools downhole may comprise a clock, or only some of the tools may comprise a clock.

A method for determining total signal latency between at least two processing elements connected to a downhole network comprises a controlling processing element comprising a synchronizing clock sending instructions over a downhole network to at least one downhole processing element comprising at least one downhole clock. The downhole processing element performs the requested actions and may send information to the controlling processing element. Time stamps may be used to determine transmission and arrival times of messages between the processing elements.

A system for synchronizing at least two clocks connected to a downhole network comprises a controlling processing element in electronic communication with a downhole synchronizing clock and connected over a downhole network to a plurality of downhole processing elements, wherein each downhole processing element is in electronic communication with at least one clock. The controlling processing element may be an integrated circuit, a processor, or a computer. Each processing element may further comprise hardware that enables the processing element to receive an instruction and comply with the instruction in a fixed amount of time. The plurality of downhole processing elements may be distributed throughout the length of the drill string, and each downhole processing element may further comprise at least one sensor for sensing a parameter of interest.

The present invention provides an advantage of accurately synchronizing downhole clocks in a short amount of time, thus saving time and operating costs as well as improving the quality of downhole operations.

DETAILED DESCRIPTION

The disclosed description is meant to illustrate selected embodiments of the present invention, and not to limit its scope. In the interest of clarity, not all of the implementation-specific details of the present invention are disclosed below. As will be recognized by those who have ordinary skill in the art, many implementation-specific details of the following embodiment may be modified without departing from the spirit and scope of the present invention.

Figure 1:
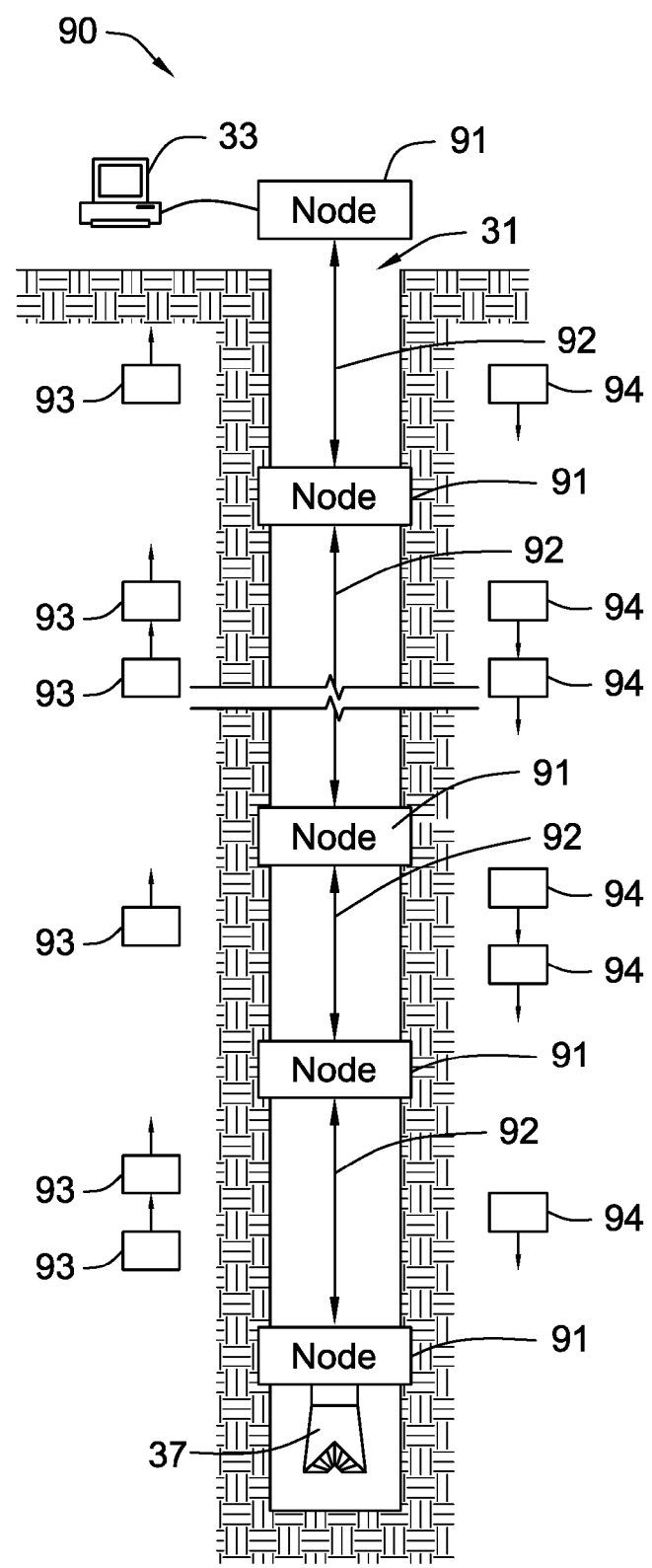
FIG. 1 is a perspective cross-sectional view of an embodiment of a downhole network.

FIG. 1 illustrates a downhole network 90 integrated into a downhole tool string 31. The downhole network 90 comprises a controlling processing element 33 and a plurality of nodes 91 in communication with each other through a downhole data transmission system 92 integrated into downhole components in a downhole tool string 31. The controlling processing element 33 is preferably a surface computer, but in other embodiments the controlling processing element 33 may be any electronic processor known to the art or an integrated circuit.

Each of the downhole components in the downhole tool string 31 comprises a communication element in a first end connected by an electrical conductor to a communication element in a second end, creating a transmission system through which data can travel between various devices and tools in the network 90. One particular implementation employs a downhole data transmission system disclosed more fully in U.S. Pat. No. 6,670,880 to Hall, et al., herein incorporated in its entirety by reference. In other embodiments the communication elements may be optical fiber couplers, acoustic couplers, or even direct electrical contacts. A downhole data transmission system 92 enables the rapid exchange of data between a node 91 and the controlling processing element 33, or between individual nodes 91 in the network 90. Each node 91 or other device in the network 90 may comprise its own processing element 33, 96 (see also FIGS. 2–4).

As in most networks, electronic packets 93, 94 are used to transfer data among the various nodes 91 or other devices connected to the network 90. Packets 94 may be transmitted downhole, and packets 93 may be transmitted uphole. The downhole network 90 may make use of any protocol known in the art to enable communication between the nodes 91 or other devices.

A more specific implementation of the downhole network 90 is more fully discussed in U.S. patent application Ser. No. 60/481,225, entitled "Distributed Downhole Drilling Network," and filed Aug. 13, 2003 in the name of David Hall, et. al., which is herein incorporated by reference.

Figure 2:
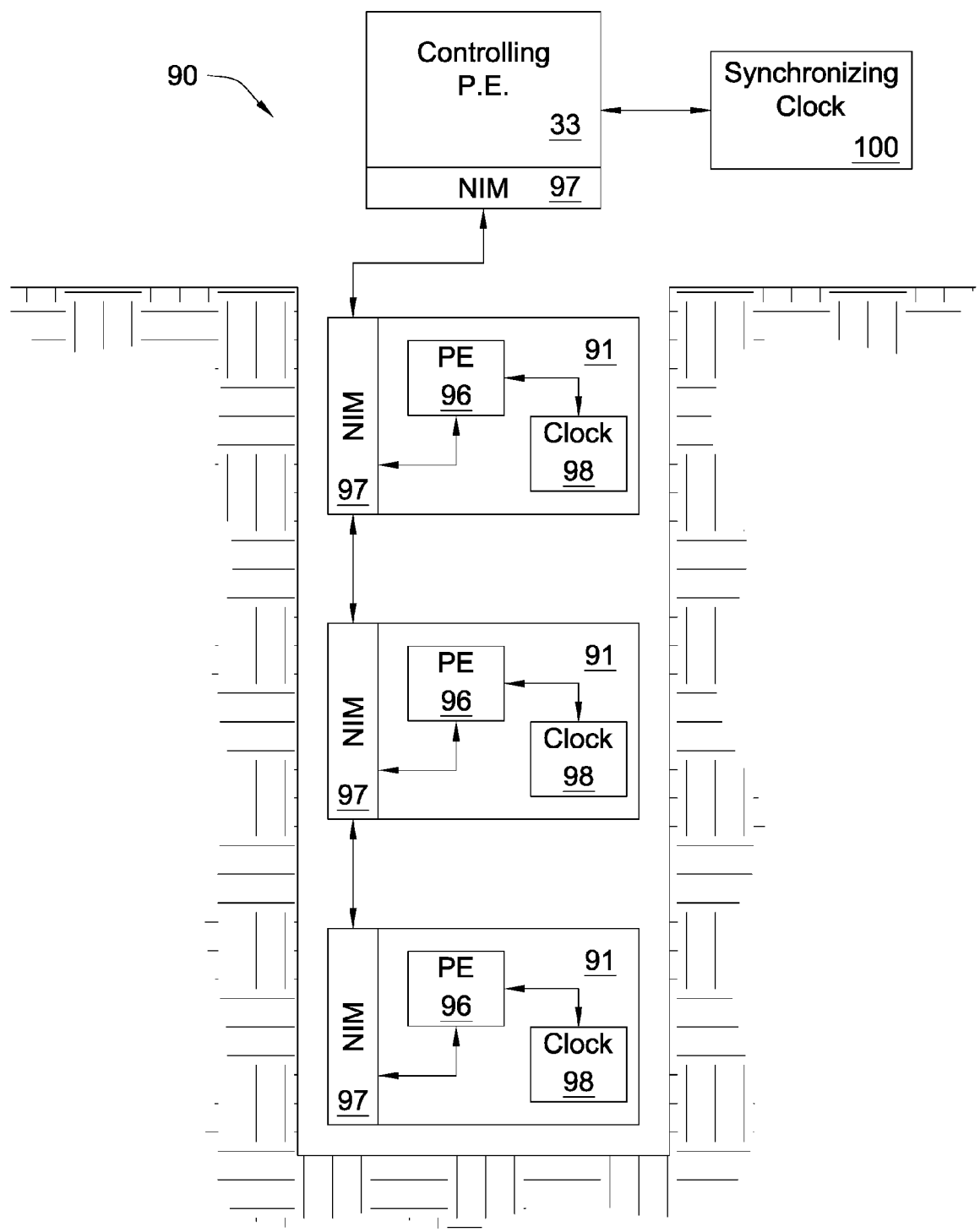
FIG. 2 is a block diagram of one embodiment of the downhole clock synchronization system.

FIG. 2 discloses one embodiment of the present invention. A controlling processing element 33 is connected to a synchronizing clock 100. In alternate embodiments of the invention, the synchronizing clock 100 is an integral part of the controlling processing element 33. The controlling processing element is in communication with a plurality of nodes 91 through the downhole network 90. Any processing element 33, 96 of the present invention may be an integrated circuit, an electronic processor, or a computer system. The synchronizing clock 100 comprises a clock source which may comprise at least one crystal, at least one transistor, at least one RC circuit, at least one LC circuit, at least one RLC circuit, or any other clock source known in the art. The controlling processing element 33 is able to perform certain functions relative to the synchronizing clock 100. For example, the controlling processing element 33 may receive the current time of day from the synchronizing clock 100 or set the synchronizing clock 100 to a given time.

Communication over the network 90 is handled by the use of network interface modems (NIMs) 97 in both the nodes 91 and the controlling processing element 33. A NIM 97 modulates and demodulates packets 93, 94 (see FIG. 1) transmitted between devices.

Each node 91 in FIG. 2 further comprises a downhole processing element 96, and a clock 98. In alternate embodiments, some nodes 91 may comprise downhole clocks 98 while others do not. The downhole processing element 96 in each node 91 is able to interpret data received over the network 90 through the NIM 97 in order to perform specific functions. Each downhole processing element 96 of each node 91 may also transmit requested information over the network 90 to another node 91 or device (not shown in FIG. 5) through its NIM 97. Downhole processing elements 96 in individual nodes 91 may further perform specific functions on their associated downhole clocks 98, such as reading the clock time or setting the clock time to a certain value.

The controlling processing element 33 is able to coordinate and direct the synchronization of downhole and synchronizing clocks 98,100, respectively, through specific directions that it sends to downhole processing elements 96 in individual nodes 91, functions performed on the synchronizing clock 100, and data received from the downhole processing elements 96 of the nodes 91.

Figure 3:
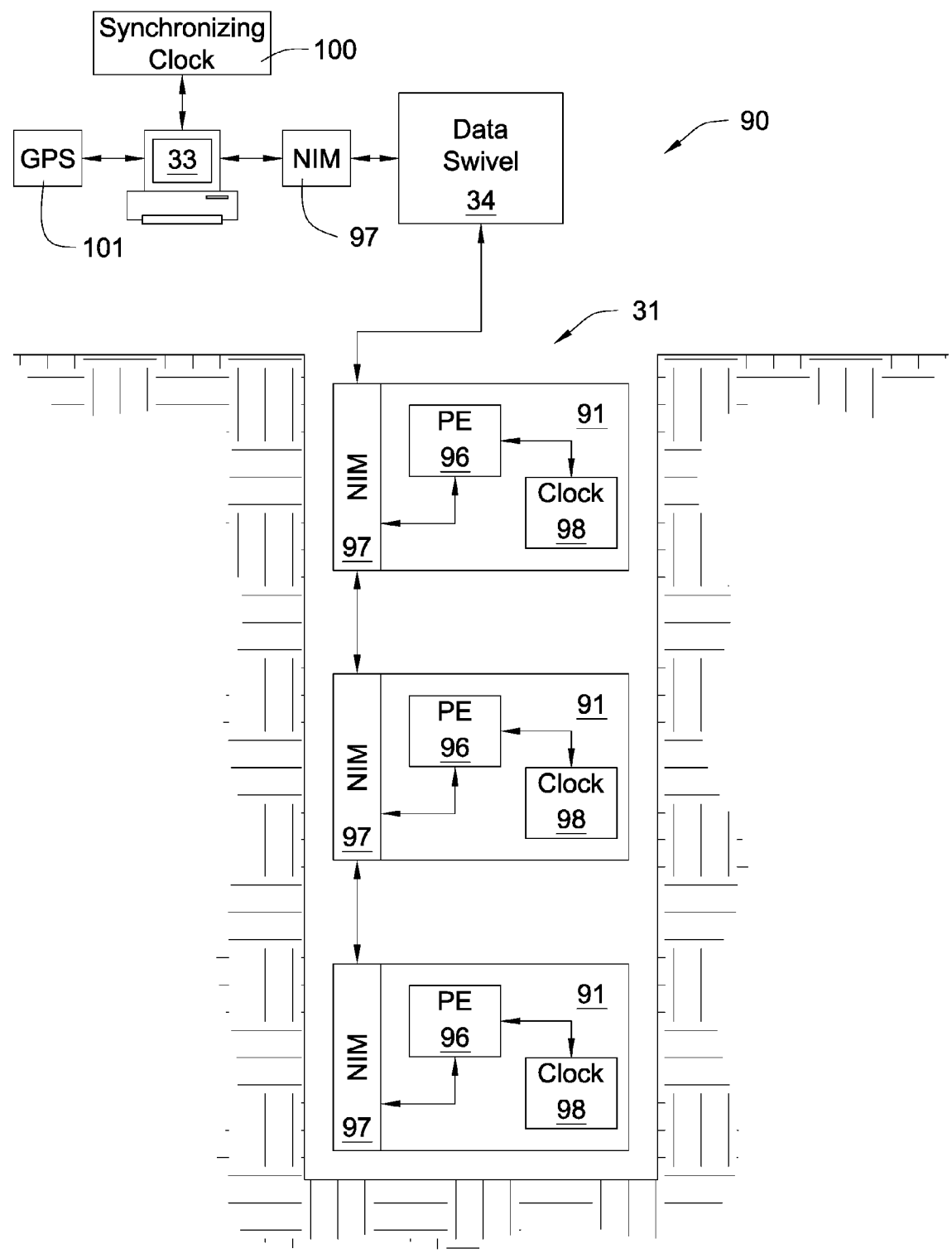
FIG. 3 is a block diagram of another embodiment of the downhole clock synchronization system.

Referring now to FIG. 3, another embodiment of the present invention is disclosed. In this embodiment, the controlling processing element 33 comprises a computer network server 33 that is connected to a global positioning service (GPS) receiver 101. The GPS receiver 101 may provide the controlling processing element 33 with accurate time of day readings. The controlling processing element 33 may set the synchronizing clock 100 to coincide with the GPS data that the controlling processing element 33 receives, thus providing a means by which all of the clocks 98, 100 may be accurately synchronized to a standardized time. In other embodiments of the invention, the controlling processing element 33 may be connected to another time source such as a local area network (LAN), a wireless network, or the internet.

A data swivel 34 is used to transmit data through the downhole network 90 while the drill string 31 is rotating. One particular implementation employs a swivel disclosed more fully in U.S. application Ser. No. 10/315,263entitled "Signal Connection for a Downhole Tool String", and filed Dec. 10, 2002in the name of the inventors David R. Hall, et al., which is herein incorporated by reference. Each node 91 is similar to those of the embodiment in FIG. 2 in that it comprises a NIM 97 and a downhole processing element 96 that may perform functions on a downhole clock 98.

Figure 4:
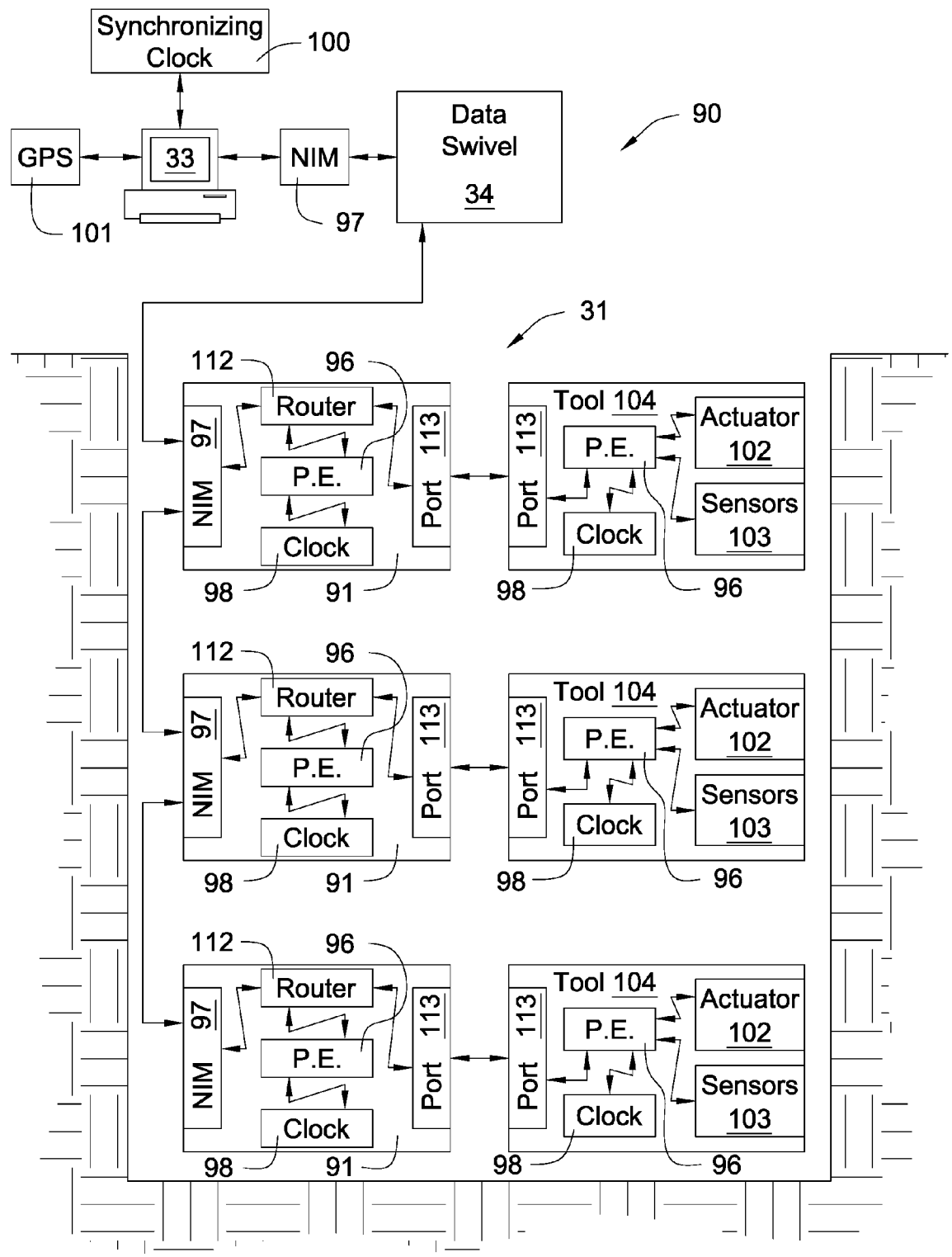
FIG. 4 is a block diagram of another embodiment of the downhole clock synchronization system.

Referring to FIG. 4, another embodiment of the present invention is represented. The controlling processing element 33 is a computer network server connected to a GPS receiver 101.

The nodes 91 in the downhole network further comprise data routers 112 and communication ports 113. Nodes 91 may also comprise additional circuitry (not shown) such as signal repeaters, additional sensors, power sources, and the like that may be useful in the downhole network but is not necessarily related to the synchronization of clocks 98, 100.

In the preferred embodiment, various downhole tools 104 may be connected to the downhole network 90 through coupling the communication ports 113 of the nodes 91 in the downhole tool string 31 with the communication ports 113 of the tools. Downhole tools 104 that may be connected to the nodes 91 through ports 113 include jars, motors, reamers, shock absorbers, turbines, hammers, blowout preventers, steering devices, mud pulse sirens, seismic sources, seismic receivers, drill bits, and NMR tools. Each downhole tool 104 may comprise a downhole processing element 96 that can perform functions on a downhole clock 98. As is the case of the nodes 91, the downhole processing element 96 in the tools 104 may comprise an integrated chip, an electronic processor, or a more complex computer system. The downhole processing element 96 in the tools 104 may also control sensors 103 and/or actuators 102. In this embodiment, the controlling processing element 33 may synchronize any of the clocks 98, 100 in the nodes 91 or the downhole tools 104 to a common time base through the downhole network 90.

Figure 5:
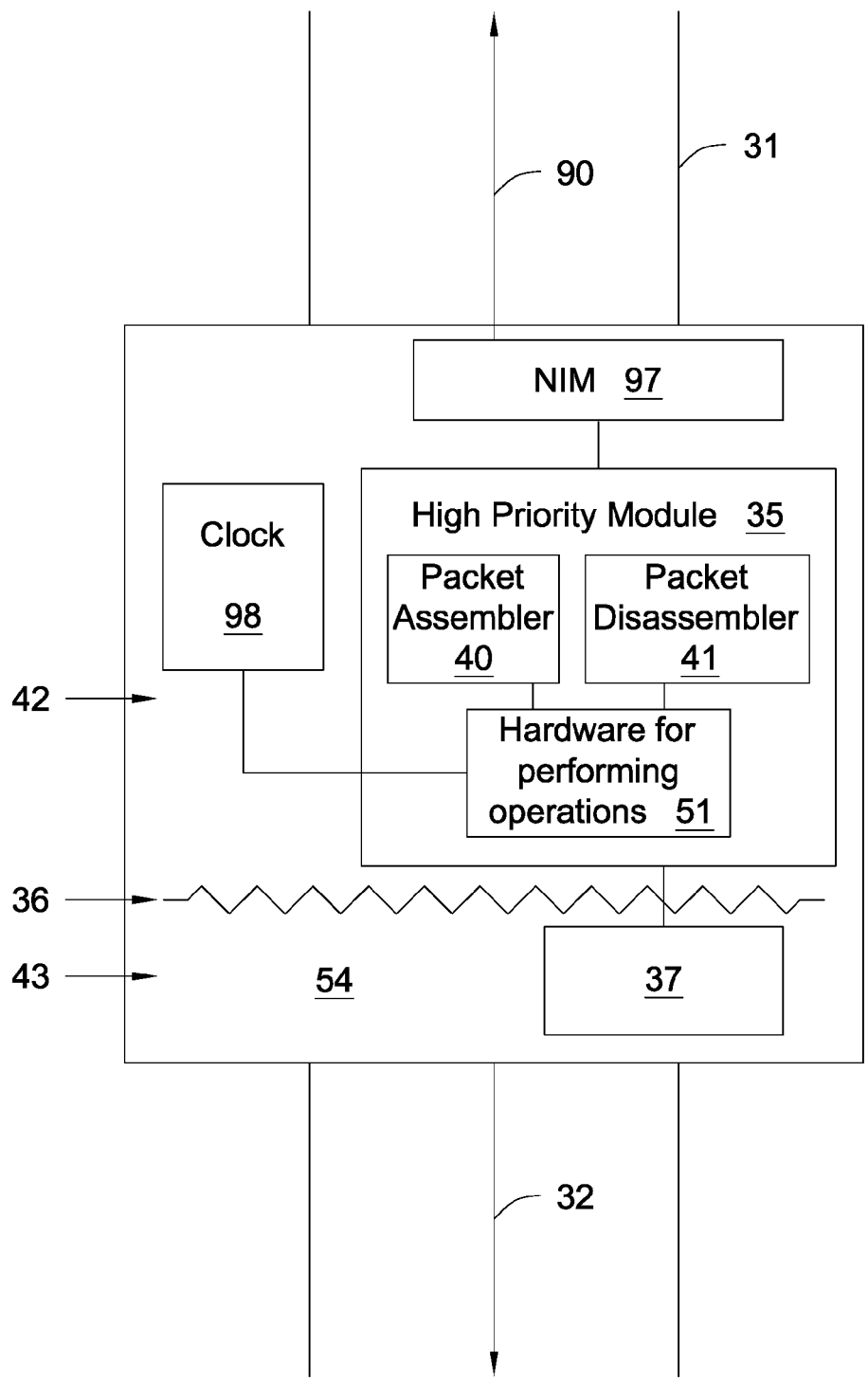
FIG. 5 is a flowchart diagram illustrating one embodiment of the method to synchronize clocks over the downhole network.

Referring now to FIG. 5, a preferred embodiment of the present invention comprises hardware that fixes the computational latency in a node 91 to a constant. Computational latency is defined as the amount of time elapsed between receiving an instruction from the network and completely processing it. Fixed computational latency reduces error in computing total signal latency by eliminating the element of error in the calculation process contributed by indeterminate processes such as interrupts or clock cycles. One particular implementation of the invention comprises a high-priority module 35. A processing element 33, 96, as described in the preceding figures, may comprise a high-priority module 35. In some embodiments, a high-priority module 35 may be considered a separate processing element 33, 96, and previously disclosed.

FIG. 5 shows the preferred embodiment of a node 91 with an apparatus for fixing computational latency. The high priority module 35 is in communication with the network interface modem 97. The high priority module 35 is also in communication with the clock 98,100. The high priority module 35 may comprise a packet assembler 40, a packet disassembler 41, and hardware 51 for performing operations. The high priority module 35 is also in communication with the rest of the local node circuitry 37. The packet disassembler 41 interprets packets as instructions to pass to either the hardware for performing operations 51 or to the rest of the local node circuitry 37.

It should be noted that the term "deterministic region" refers to an area where the time required for operations is without significant variation, and may be calculated. The term "non-deterministic region" refers to an area where the time required for operations has significant variation, and is indeterminate. The term "deterministic boundary" refers to a boundary between a deterministic region and a non-deterministic region.

The deterministic boundary 36 is the division between the deterministic region 42 and the non-deterministic region 43. The deterministic region encompasses the NIM 97, the high priority module 35, and the clock 98,100.

The high priority module 35 may fix the time it takes to process some instructions by processing them entirely within the deterministic region 42. The hardware 51 for performing operations is specially configured to process high priority instructions in a fixed amount of time for each operation. When a high priority packet is received by the NIM 97, the packet disassembler 41 may parse it into individual instructions. The packet disassembler 41 may recognize an instruction as high priority and process it in the hardware 51 for performing operations without passing the instruction on to the rest of the local node circuitry 37.

In general, the high priority module 35 is responsible for passing information between the local node circuitry 46 and the NIM 97. Loading a buffer 91 for the local node circuitry 37 may be considered non-deterministic, and therefore may fall within the non-deterministic region 43. Actions such as reading and setting the clock 98, 100, actuating an actuator, or receiving oscillations from a clock source may be considered to be deterministic, and may be handled by the high priority module 35.

Figure 6:
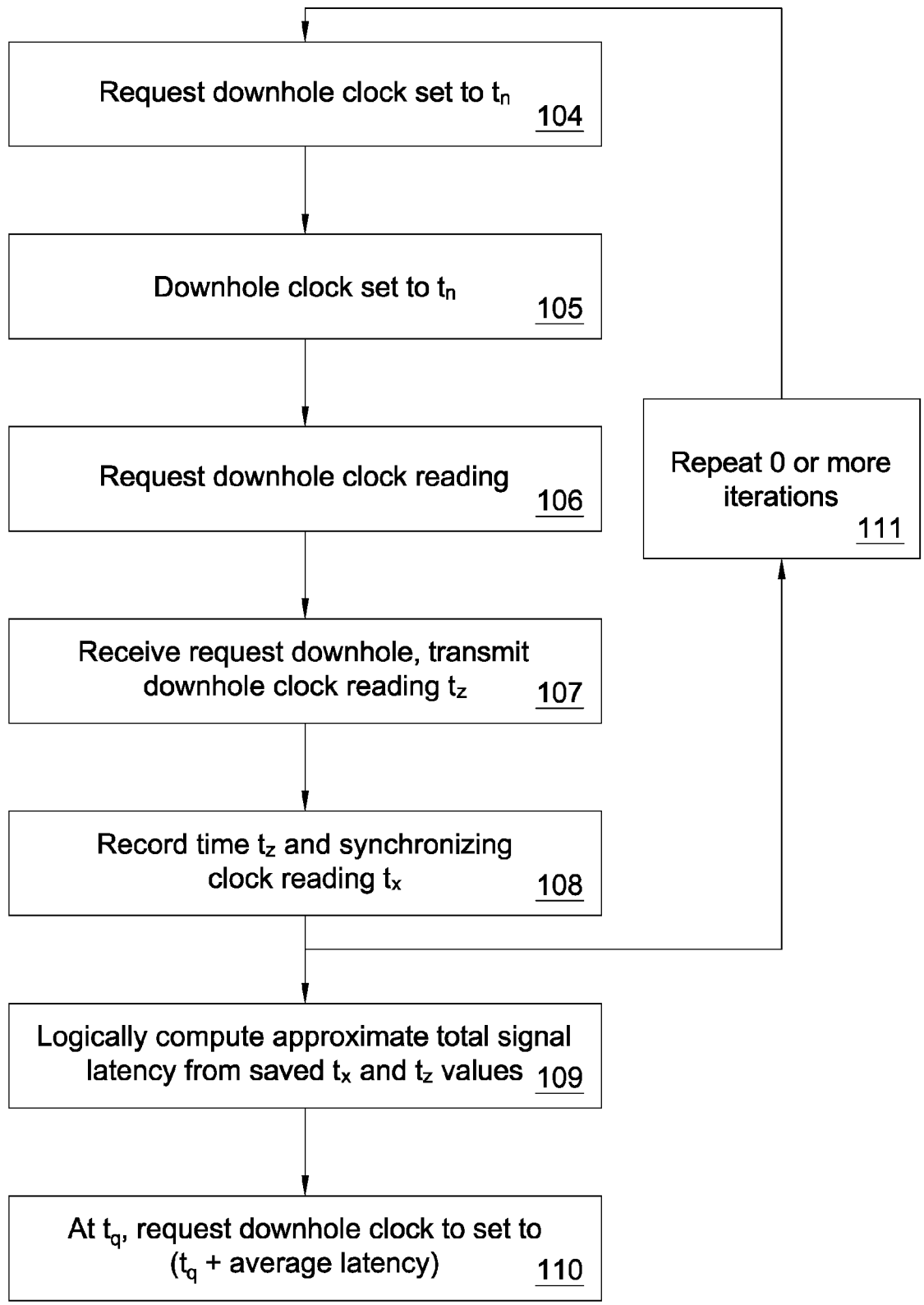
FIG. 6 is a block diagram of an apparatus for fixing computational latency.

Referring now to FIG. 6, a method is disclosed for the synchronization of at least two clocks over a downhole network. The synchronization process may be initiated manually through a controlling processing element located above the ground or automatically, such as before a measurement is made or a certain action performed. The method for downhole clock synchronization comprises determining 104, 105, 106, 107, 108, 111 the total signal latency between a controlling processing element 33 in electronic communication with a synchronizing clock 100 and a downhole processing element 96 in electronic communication with a downhole clock 98 and sending 110 a request to the downhole processing element 96 to set the downhole clock 98 to a synchronizing time $t_q$ adjusted for total signal latency.

In the preferred embodiment of the method, the controlling processing element 33 sends a first request 104 to the downhole processing element 96 over the downhole network 90 to set the downhole clock 98 to a specified time $t_n$. In this embodiment, time $t_n$ is the current time of day according to the synchronizing clock 98. Preferably, requesting 104 the downhole processing element 96 to set the downhole clock 98 to a specified time $t_n$ includes the controlling processing element 33 assembling a packet with a place holder for the clock reading and sending it across a deterministic boundary to a high priority module 35 which reads the clock 98, inserts the clock reading (i.e. the specified time $t_n$) into the packet, and transmits the packet over the downhole network to the downhole processing element 96.

The downhole processing element 96 receives the packet containing the first request 104 from the controlling processing element 33 and processes it. In the preferred embodiment, the downhole processing element 96 processes the request completely in a high-priority module 35 by receiving the packet through a NIM 97, disassembling and recognizing the packet 94, and setting 105 the downhole clock to the specified time $t_n$ received in the packet within a fixed period of time. When the downhole clock 98 is set 105 to the specified time $t_n$, an offset is created between the synchronizing clock 100 and the downhole clock 98 approximately equal to the total signal latency from the controlling processing element 33 to the downhole processing element 96.

The preferred embodiment of the method further comprises the controlling processing element 33 sending a second packet to the to the downhole processing element 96 requesting 106 the downhole processing element 96 to relay a downhole clock reading (time $t_z$) back to the controlling processing element 33. Preferably, the second request 106 is processed by the downhole processing element 96 outside the deterministic boundary by assembling an electronic packet with a placeholder for the clock reading. The high priority module 35 of the downhole processing element 96 then completes the operation within the deterministic boundary by reading the downhole clock 98, inserting the downhole clock reading (time $t_z$) into the packet, and transmitting 107 the packet to the controlling processing element 33. Time $t_z$ is the time according to the downhole clock 98 at the approximate instant the second request 106 is transmitted.

The controlling processing element 33 records 108 the value of time $t_z$ as received by the downhole processing element 96 and the reading of the synchronizing clock 100 at the approximate instant (time $t_x$) in which time $t_z$ is received by the controlling processing element 33. Preferably, the controlling processing element 33 comprises a high-priority module 35 that disassembles and at least partially processes the packet from the downhole processing element 96. Time $t_x$ may be recorded by an electronic time stamp. The values of times $t_z$ and $t_x$ may be stored in memory incorporated into the controlling processing element 33. In the preferred embodiment, the process of computing 104, 105, 106, 107 and recording 108 values of times $t_z$ and $t_x$ is repeated 111 a set number of iterations in order to compute the values of several distinct $t_z$ and $t_x$ pairs. Alternately, only one $t_z$ value and one $t_x$ value may be recorded 108.

Preferably, the values recorded 108 for times $t_z$ and $t_x$ are used by the controlling processing element 33 to logically compute 109 approximate one-way total signal latency between the controlling processing element 33 and the downhole processing element 96. One method by which this may be done is that of assuming the one-way total signal latency going down the borehole to be equal to the one-way total signal latency coming up the borehole. The one-way total signal latency may then be determined by computing the difference between a $t_z$ and $t_x$ pair and dividing it by two.

In other embodiments of the present invention, different methods for determining total signal latency may be used.

Once the approximate one-way total signal latency between the controlling processing element 33 and the downhole processing element 96 is known, a synchronizing time $t_q$ is determined by the controlling processing element 33. A request 110 is sent to the downhole processing element 96 to set the downhole clock 98 to the synchronizing time $t_q$ adjusted for one-way total signal latency, being ($t_q$+one-way total signal latency). When more than one $t_x$ and $t_z$ pair has been recorded 108, 111, the number for one-way total signal latency may be an average of several computed values. The controlling processing element 33 then sends a packet to the downhole processing element 96, requesting 110 the downhole processing element 96 to set the downhole clock 98 to a synchronizing time adjusted for one-way total signal latency ($t_q$+one-way total signal latency). Time $t_q$ is the reading of the synchronizing clock 100 at the approximate instant the packet with request 110 is transmitted. Preferably, the packet with request 110 is transmitted and processed in the same manner described above for the first request 104. Thus, at approximately time ($t_q$+total signal latency) the downhole clock 98 is synchronized to the synchronizing clock 100.

In selected embodiments, a plurality of downhole clocks 98 at a plurality of locations along the downhole tool string 31 may be synchronized with the synchronizing clock 100 using the method described above. In other embodiments, a plurality of downhole clocks 98 governed by one downhole processing element 96 in a tool 104 or a network node 91 may be concurrently synchronized.

Whereas the present invention has been described in particular relation to the drawings attached hereto, it should be understood that other and further modifications apart from those shown or suggested herein, may be made within the scope and spirit of the present invention.

The invention claimed is:

1. A method for synchronization of at least two clocks connected to a downhole network comprising: a continuing processing element comprising a synchronizing clock sending a first request to a downhole processing element comprising at least one downhole clock to set the downhole clock to time t.sub.n; the controlling processing element sending a second request to the downhole processing element to relay a time t.sub.z back to the controlling processing element, time t.sub.z being the time according to the downhole clock at the approximate instant the second request is received; the controlling processing element receiving time t.sub.z from the downhole processing element and recording a time t.sub.x, time t.sub.x being the approximate instant time t.sub.z arrives from the downhole processing element, according to the synchronizing clock; approximately determining a total signal latency between the controlling processing element and the downhole processing element by logical computations using time t.sub.z and time t.sub.z; the controlling processing element sending a request to the downhole processing element to set the downhole clock to a synchronizing time adjusted to compensate for total signal latency.

2. The method of claim 1, wherein the downhole network is housed within a downhole tool string.

3. The method of claim 2, wherein the downhole network comprises a plurality of downhole components, wherein each downhole component comprises a conductor connecting a communication element in one end and a second communication element in another end.

4. The method of claim 3, wherein the first and second communication elements are selected from the group consisting of inductive coils, optical fiber couplers, and electrical contacts.

5. The method of claim 4, wherein the inductive coils are encapsulated in circular, magnetically conductive, electrically insulating troughs.

6. The method of claim 1, wherein electronic time stamps are used to determine transmission latency between processing elements.

7. The method of claim 1, wherein at least one of the processing elements comprises hardware that fixes the computational latency to a known constant.

8. A method for determining total signal latency between at least two processing elements connected to a downhole network comprising: a controlling processing element comprising a first clock sending a first request to a downhole processing element comprising a downhole clock to set the downhole clock to time t.sub.n; the controlling processing element sending a second request to the downhole processing element to relay a time t.sub.z back to the controlling processing element, time t.sub.z being the time according to the downhole clock at the approximate instant the second request is received; the controlling processing element receiving time t.sub.z from the downhole processing element and recording a time t.sub.x, time t.sub.x being the approximate instant time t.sub.z arrives from the downhole processing element, according to the first clock; the controlling processing element approximately determining a total signal latency between itself and the downhole processing element by logical computations using time t.sub.z and time t.sub.x.

9. The method of claim 8, wherein the downhole network is housed within a downhole tool string.

10. The method of claim 9, wherein the downhole network comprises a plurality of downhole components, wherein each downhole component comprises a conductor connecting a first communication element in one end and a second communication element in another end.

11. The method of claim 10, wherein the first and second communication elements are selected from the group consisting of inductive coils, optical fiber couplers, and electrical contacts.

12. The method of claim 11, wherein the inductive coils are encapsulated in circular, magnetically conducting, electrically insulating troughs.

13. The method of claim 8, wherein at least one time t.sub.z and at least one time t.sub.x are measured to determine an approximate average total signal latency between the first and second devices.

14. The method of claim 8, wherein at least one of the processing elements comprises hardware that fixes the computational latency to a known constant.

15. The method of claim 8, wherein at least one of the clocks is located outside of the well bore.

16. The method of claim 8, wherein at least one of the downhole clocks is attached to the tool string.

17. The method of claim 8, wherein the downhole clocks are distributed along the tool string.

18. The method of claim 8, wherein the downhole clocks are associated with tools selected from the group consisting of mud motors, turbines, jars, repeaters, amplifiers, nodes, mud hammers, shock absorbers, reamers, under-reamers, fishing tools, steering elements, MWD tools, LWD tools, seismic sources, seismic receivers, sensors, modems, swivels, pumps, perforators, other tools with an explosive charge, mud-pulse sirens, well casing, blow-out preventors, bottom hole assemblies, switches, routers, multiplexers, piezoelectric devices, optical transmitter, optical regenerators, optical receivers, and wireless transceivers.

19. The method of claim 8, wherein at least one of the processing elements is connected to an information source through a medium selected from the group consisting of global positioning systems, computer networks, and wireless networks.

20. The method of claim 8, wherein at least three clocks are concurrently electrically synchronized.

21. The system of claim 8, wherein at least one clock comprises a clock source selected from the group consisting of at least one crystal, at least one transistor, at least one oscillator, at least one RC circuit, at least one LC circuit, and at least one RLC circuit.

* * * * *